(12) United States Patent
Young

(10) Patent No.: US 7,185,907 B1
(45) Date of Patent: Mar. 6, 2007

(54) EXTENDABLE TRAILER HITCH ASSEMBLY

(76) Inventor: Glanford W. Young, 771 SW. 8th Ct., North Lauderdale, FL (US) 33068

( * ) Notice: Subject to any disclaimer, the term of this patent is extended or adjusted under 35 U.S.C. 154(b) by 75 days.

(21) Appl. No.: 11/051,134

(22) Filed: Feb. 7, 2005

(51) Int. Cl.
*B60D 1/54* (2006.01)
*B60D 1/44* (2006.01)

(52) U.S. Cl. ............... 280/491.1; 280/422; 280/414.1; 280/421; 280/420

(58) Field of Classification Search ............ 280/491.1, 280/414.1, 422, 421, 420
See application file for complete search history.

(56) References Cited

U.S. PATENT DOCUMENTS

| | | | |
|---|---|---|---|
| 3,155,399 A | | 11/1964 | Fetzko |
| 4,169,611 A | | 10/1979 | Smith et al. |
| 4,232,879 A | | 11/1980 | Boxrud |
| 4,232,990 A | | 11/1980 | Pierce |
| 4,240,647 A | * | 12/1980 | Lewis .................. 280/482 |
| 4,407,519 A | * | 10/1983 | Heyser ................. 280/482 |
| 4,611,821 A | * | 9/1986 | Jeanson et al. ......... 280/482 |
| 4,726,601 A | * | 2/1988 | Stevens ................ 280/414.1 |
| 5,011,177 A | * | 4/1991 | Grice .................. 280/482 |
| D368,053 S | * | 3/1996 | Gallagher |
| D372,001 S | | 7/1996 | Alford |
| 6,685,209 B1 | | 2/2004 | Guio |
| 2003/0132606 A1 | * | 7/2003 | Eskridge ............... 280/482 |
| 2004/0075242 A1 | * | 4/2004 | Richards .............. 280/478.1 |

* cited by examiner

*Primary Examiner*—Lesley D. Morris
*Assistant Examiner*—Marlon Arce-Diaz

(57) ABSTRACT

A trailer hitch assembly includes a controller mounted within a vehicle cab and electrically coupled to a power supply source of the vehicle. A trailer hitch tongue section is attachable to the vehicle and provided with an elongated chamber. The tongue section has opposed end portions defining a socket and an opening. An adaptable ram includes displaceable support arms engaged within the chamber. The support arms are upwardly spaced from a ground surface. The assembly further includes a trailer for receiving and supporting a boat. The trailer is provided with wheels and a front end portion attached to the ram. An auxiliary anchor beam vertically traverses one of the support arms and is provided with end portions situated above and below one support arm. A mechanism is included for telescopically adapting the support arms such that a spatial distance between the vehicle and the boat can be biased.

9 Claims, 3 Drawing Sheets

EXTENDABLE TRAILER HITCH ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to trailer hitch assemblies and, more particularly, to a trailer hitch assembly for towing various types of boats between remote locations such that the boats can be loaded and unloaded from a water ramp without requiring a rear end of a towing vehicle to dip down into the water.

2. Prior Art

As any boat enthusiast knows, there are severe limitations to conventional boat trailers which prevent the enthusiast from launching or retrieving his boat in shallow water, or at low tide, or in the event his boat has a deep keel, such as, for example, in the case of sailboats which are provided with relatively deep fixed keels. While these adverse conditions are not always present when the boater wishes to enjoy the pleasures afforded by boating or sailing, they nevertheless may limit his full use of his or her boat.

There have been attempts in the prior art to minimize the loss of full use of boats for the operator by arranging boat trailer tongues with extension devices which permit the operator to elongate the tongue so that the vehicle towing the trailer need not drive his vehicle too close to, or into the water's edge, and yet be able to move the trailer further out into the water, thereby avoiding inadvertent scraping of the bottom of the launch site by his boat keel.

A disadvantage with some of the conventional tongue and extension mechanisms is that these extensions are integrated into, and are a part of, the tongue itself, and thereby become too expensive for the average boater. These arrangements require that those boaters who presently own and operate conventional boat trailers must discard their boat trailer and purchase a new one in the event that they need the same only occasionally. It would thus be advantageous to have an extending mechanism that may be attached to a conventional trailer. One example shows a boat trailer extension tongue wherein an extension having a rack gear is arranged to telescope within the tubular frame of the boat trailer in order to lengthen or shorten the total length of the tongue. In this arrangement, the extension and associated structure is integrated with a boat trailer, thereby requiring the operator to purchase the boat trailer with this accessory whether he needs it or not.

Another disadvantage of the prior art examples for extending the tongue of a boat trailer is the fact that they must be manually operated. This can be very time and energy consuming, and thus may discourage a boater from using their water craft as often as they would like.

Accordingly, a need remains for an extendable trailer hitch assembly in order to overcome the above-noted shortcomings. The present invention satisfies such a need by providing a trailer hitch assembly that is easy to use, durable in design, remotely extendable, and increases time-savings and safety. Such an extendable trailer hitch assembly has an extendable length so that the rear of a towing vehicle advantageously remains clear of the water, thus preventing rust damage to the vehicle. The boater further prevents the slipping and spinning of his wheels on the ramp upon exiting the ramp, since the vehicle's tires do not become wet. This greatly improves the safety of launching and loading a water craft, while also extending the life of the vehicle's tires.

BRIEF SUMMARY OF THE INVENTION

In view of the foregoing background, it is therefore an object of the present invention to provide an extendable trailer hitch assembly. These and other objects, features, and advantages of the invention are provided by a remotely operable trailer hitch assembly for towing various types of boats between remote locations such that the boats can be loaded and unloaded from a water ramp without requiring a rear end of a towing vehicle to dip down into the water.

The trailer hitch assembly includes a controller mounted within a vehicle cab that is electrically coupled to an internal power supply source of the vehicle. A trailer hitch tongue section is removably attachable to the vehicle and provided with an elongated chamber formed therein and operably connected to a rear portion of the vehicle. Such a tongue section has axially opposed end portions defining a ball-shaped socket and an opening respectively.

An adaptable ram includes a plurality of linearly displaceable support arms formed from tubular steel and concentrically engaged within the chamber. Such support arms are aligned along a horizontal path upwardly spaced from a ground surface. The trailer hitch tongue section is preferably intermediately juxtaposed between the anchor beam and the vehicle rear end when the ram is biased to a retracted position. Such an anchor beam is linearly displaced with the one support arm when the ram is biased towards an extended position.

The present invention further includes a trailer sized and shaped for effectively receiving and supporting a boat thereon. Such a trailer is provided with a plurality of wheels and a front end portion attached to the ram such that the trailer can conveniently be towed between remote locations.

An auxiliary anchor beam is oriented along a vertical path traversing one of the support arms wherein the anchor beam is provided with axially aligned end portions situated above and below the one support arm for advantageously assisting to maintain the ram at a substantially stable position during loading and unloading conditions. Such an anchor beam may further include a castor operably attached to a lower one of the anchor beam end portions and a handle securely connected to the anchor beam and offset adjacent to an upper one of the anchor beam end portions for conveniently assisting the operator to manually bias the castor wheel and an elongated body of the anchor beam between alternate positions.

A mechanism is included for telescopically adapting the support arms between extended and retracted positions such that a spatial distance between the vehicle and the boat can conveniently be selectively biased as desired by the operator. The telescopic mechanism preferably includes a combined hydraulic sump and pump electrically mated to the controller such that an operator can advantageously remotely operate the hydraulic sump and pump while seated within the vehicle cab. Such a hydraulic sump and pump housing discharges a predetermined volume of fluid respectively. The hydraulic sump and pump includes a flexible conduit that has opposed end portions in fluid communication with the chamber and the sump wherein the plurality of arms are caused to extend linearly away from the trailer hitch tongue section when a selected volume of the fluid is introduced into the chamber.

The hydraulic sump and pump are preferably mounted on top of the anchor beam and are readily accessible by the operator during loading and unloading procedures such that the operator can manually deactivate the hydraulic sump and pump as needed.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
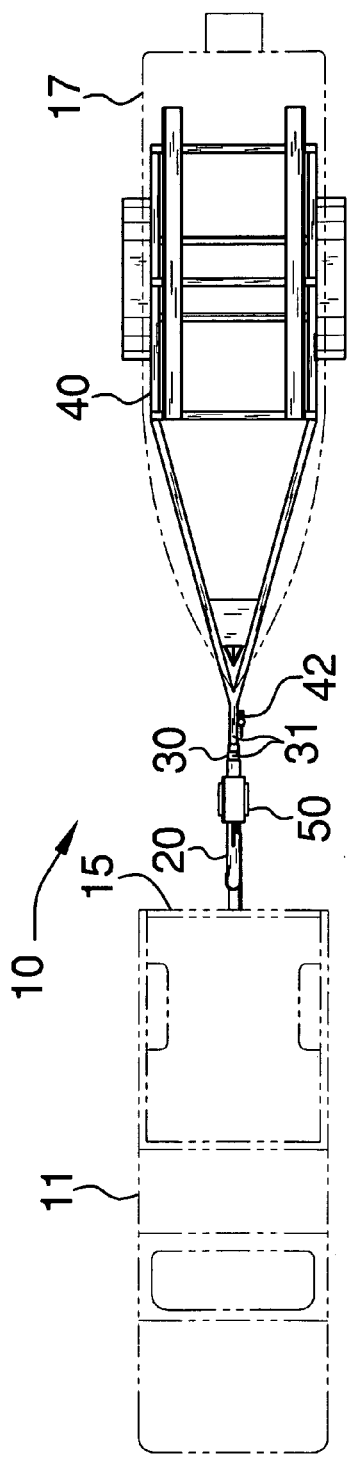
FIG. 1 is a top plan view showing an extendable trailer hitch assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–4 by the reference numeral 10 and is intended to provide an extendable trailer hitch assembly. It should be understood that the assembly 10 may be used to extend many different types of trailers and should not be limited in use to only boat trailers.

Figure 2:
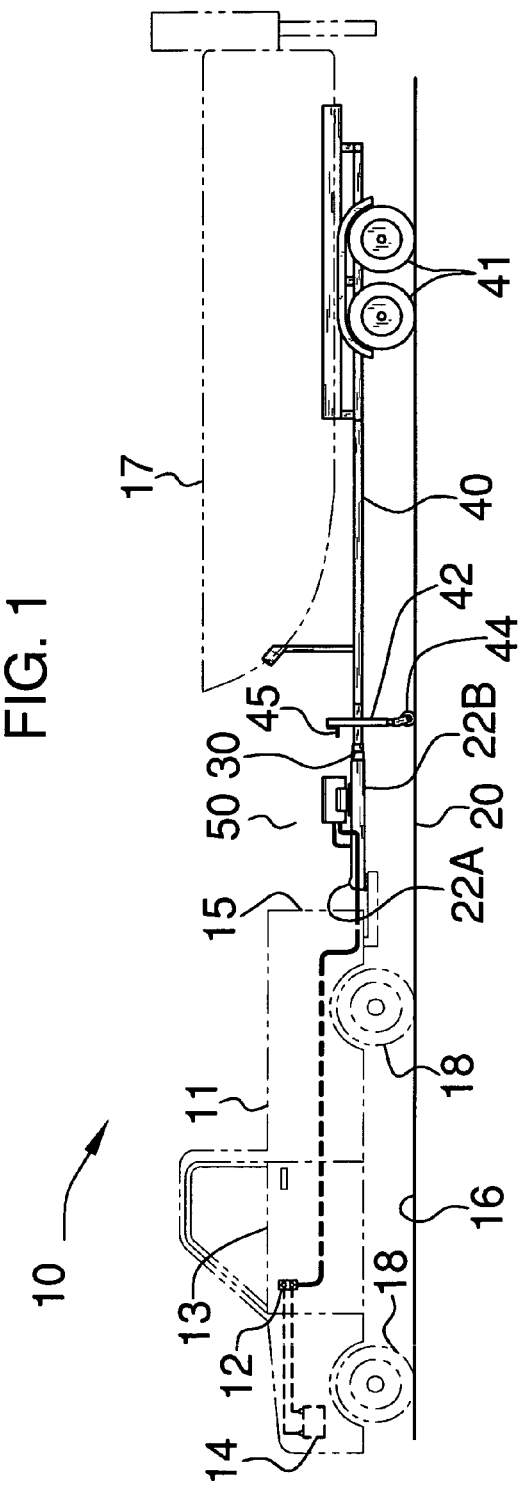
FIG. 2 is a side-elevational view of the assembly shown in FIG. 1.

Referring initially to FIGS. 1 and 2, the assembly 10 includes a controller 12 mounted within a vehicle cab 13 that is electrically coupled to an internal power supply source 14 of the vehicle 11. Such a controller 12 conveniently allows a user to operate the assembly 10 from a remote location by themselves, instead of having to do so manually and with the assistance of a second individual, as is usually the case. A trailer hitch tongue section 20 is removably attachable to the vehicle 11 and provided with an elongated chamber 21 formed therein and operably connected to a rear portion 15 of the vehicle 11. Such a tongue section 20 has axially opposed end portions 22A, 22B defining a ball-shaped socket 22A and an opening 22B respectively. Of course, the ball shaped socket 22A may be produced in a variety of different sizes to accommodate variously shaped hitches, as is well known to a person of ordinary skill in the art.

Figure 3:
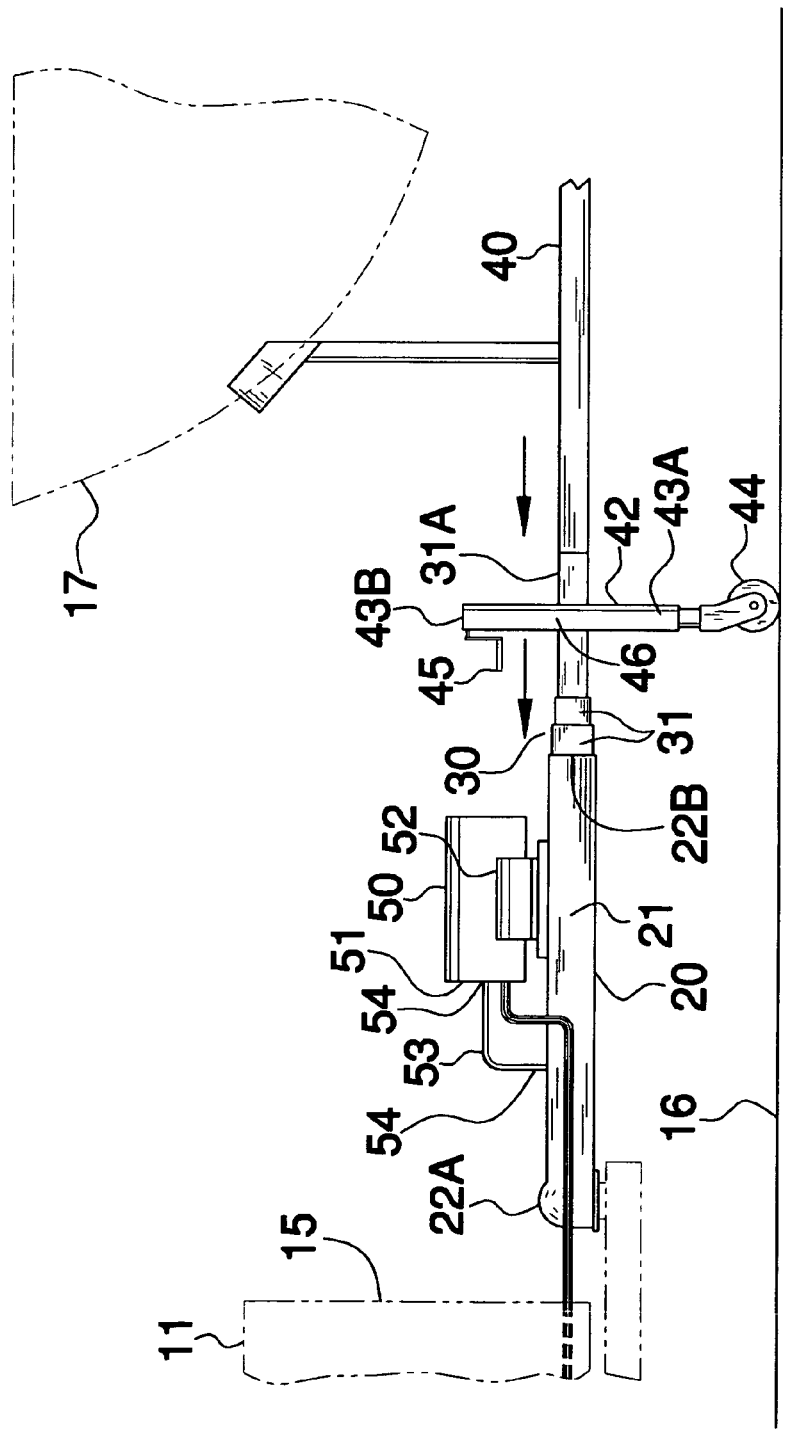
FIG. 3 is an enlarged side-elevational view of the assembly shown in FIG. 2, showing the telescopic mechanism at a retracted position.
Figure 4:
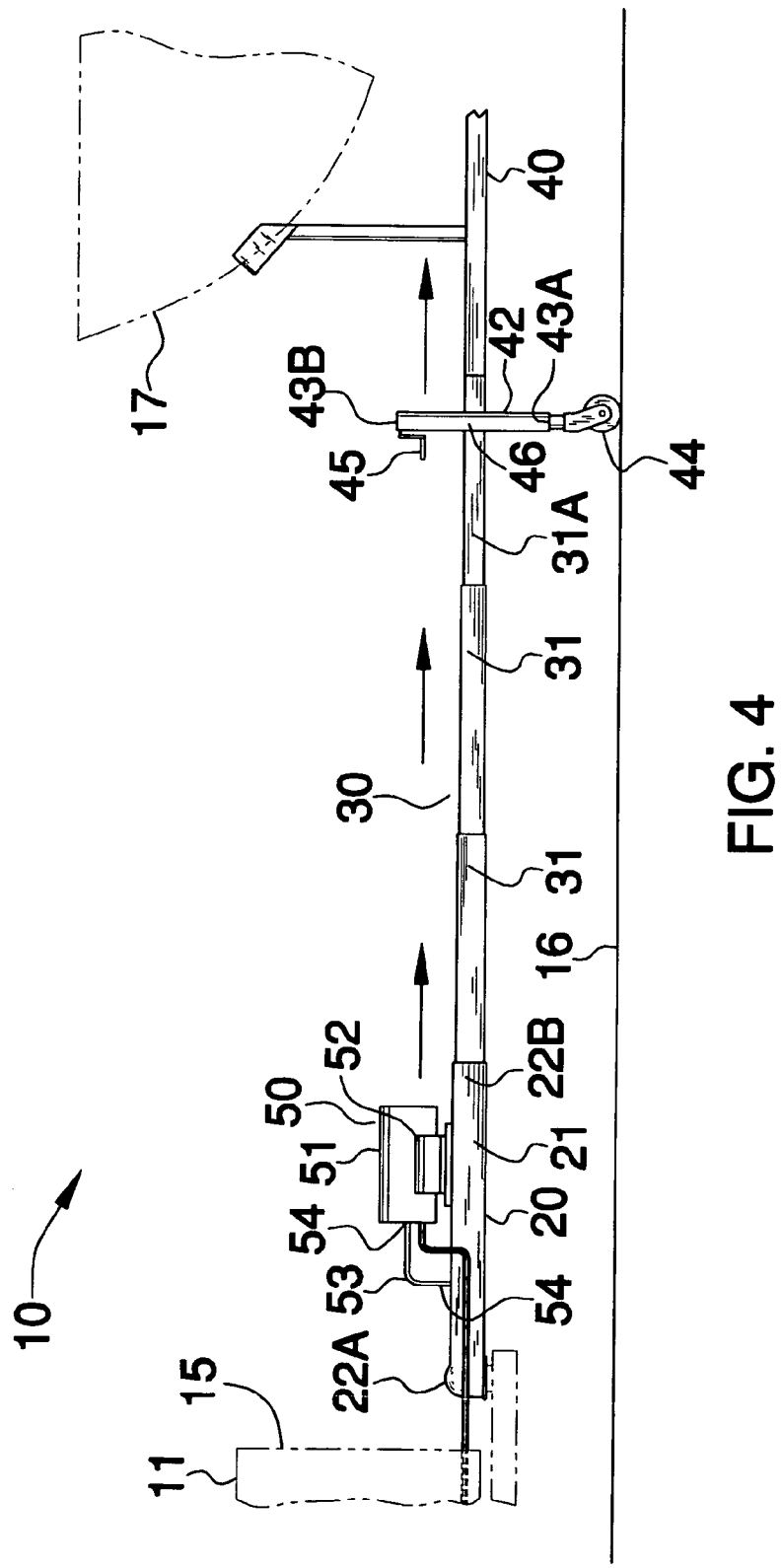
FIG. 4 is an enlarged side-elevational view of the assembly shown in FIG. 2, showing the telescopic mechanism at an extended position.

Referring to FIGS. 3 and 4, an adaptable ram 30 includes a plurality of linearly displaceable support arms 31 formed from tubular steel and concentrically engaged within the chamber 21. Such support arms 31 are aligned along a horizontal path upwardly spaced from a ground surface 16. Of course, the support arms 31 may be produced in a variety of different lengths and diameters so as to effectively support differently sized boats and other equipment, as is obvious to a person of ordinary skill in the art. The trailer hitch tongue section 20 is intermediately juxtaposed between the anchor beam 42 (described herein below) and the vehicle rear end 15 when the ram 30 is biased to a retracted position. Such an anchor beam 42 is linearly displaced with the one support arm 31A when the ram 30 is biased towards an extended position, thus advantageously relieving the downward forces experienced by the one support arm 31A when same is in the extended position.

Referring to FIGS. 1 and 2, the present invention further includes a trailer 40 sized and shaped for effectively receiving and supporting a boat 17 thereon. Of course, the assembly 10 can be installed on a previously purchased trailer 40 such that there is no need to purchase a new trailer 40 solely for the use of the assembly 10. Furthermore, the assembly 10 does not have to be limited in use to trailers 40 for only towing a boat 17, but may be employed on trailers 40 of any sort, as is obvious to a person of ordinary skill in the art. Such a trailer 40 is provided with a plurality of wheels 41 and a front end portion 42 attached to the ram 30 such that the trailer 40 can conveniently be towed between remote locations.

Referring to FIGS. 1 through 4, an auxiliary anchor beam 42 is oriented along a vertical path traversing one of the support arms 31A wherein the anchor beam 42 is provided with axially aligned end portions 43 situated above and below the one support arm 31A for advantageously assisting to maintain the ram 30 at a substantially stable position during loading and unloading conditions. Such an anchor beam 42 further includes a castor wheel 44 operably attached to a lower one 43A of the anchor beam end portions 43 and a handle 45 securely connected to the anchor beam 42 and offset adjacent to an upper one 43B of the anchor beam end portions 43 for conveniently assisting the operator to manually bias the castor wheel 44 and an elongated body 46 of the anchor beam 42 between alternate positions.

Referring to FIGS. 3 and 4, a mechanism 50 is included for telescopically adapting the support arms 31 between extended and retracted positions such that a spatial distance between the vehicle 11 and the boat 17 can conveniently be selectively biased as desired by the operator. This advantageously prevents a boater from having to place the rear portion 15 of their vehicle 11 in the water, thus preventing rust damage thereto. Furthermore, the vehicle's 11 tires 18 are kept out of the water as well, thus allowing the vehicle 11 to ascend the ramp without spinning or slipping on wet tires 18, which may result in damage to the tires 18 or injury in the event of an accident. The telescopic mechanism 50 includes a combined hydraulic sump 51 and pump 52 electrically mated to the controller 12 such that an operator can advantageously remotely operate the hydraulic sump 51 and pump 52 while seated within the vehicle cab 13. Such a hydraulic sump 51 and pump 52 housing discharges a predetermined volume of fluid respectively. The hydraulic sump 51 and pump 52 includes a flexible conduit 53 that has opposed end portions 54 in fluid communication with the chamber 21 and the sump 51 wherein the plurality of arms 31 are caused to extend linearly away from the trailer hitch tongue section 20 when a selected volume of the fluid is introduced into the chamber 21.

Referring to FIGS. 1 through 4, the hydraulic sump 51 and pump 52 are mounted on top of the trailer hitch tongue section 20 and are readily accessible by the operator during loading and unloading procedures such that the operator can manually deactivate the hydraulic sump 51 and pump 52 as needed. Mounting of the hydraulic sump 51 and pump 52 on top of the trailer hitch tongue section 20 advantageously prevents those components from becoming wet and possibly malfunctioning, thus ensuring the boater is able to use the assembly 10 for a long period of time.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A remotely operable trailer hitch assembly for towing various types of boats between remote locations such that the boats can be loaded and unloaded from a water ramp without requiring a rear end of a towing vehicle to dip down into the water, said trailer hitch assembly comprising:
    a controller mounted within a vehicle cab and electrically coupled to an internal power supply source of the vehicle;
    a trailer hitch tongue section provided with an elongated chamber formed therein and operably connected to a rear portion of the vehicle, said tongue section having axially opposed end portions defining a ball-shaped socket and an opening respectively;
    an adaptable ram including a plurality of linearly displaceable support arms concentrically engaged within said chamber, said support arms being aligned along a horizontal path upwardly spaced from a ground surface;
    a trailer sized and shaped for receiving and supporting a boat thereon, said trailer being provided with a plurality of wheels and a front end portion attached to said ram such that said trailer can be towed between remote locations;
    an auxiliary anchor beam oriented along a vertical path traversing one said support arms wherein said anchor beam is provided with axially aligned end portions situated above and below said one support arm for assisting to maintain said ram at a substantially stable position during loading and unloading conditions; and
    means for telescopically adapting said support arms between extended and retracted positions such that a spatial distance between the vehicle and the boat can be selectively biased as desired by the operator;
    wherein said telescopic means comprises
    a combined hydraulic sump and pump electrically mated to said controller such that an operator can remotely operate said hydraulic sump and pump while seated within the vehicle cab, said hydraulic sump and pump housing and discharging a predetermined volume of fluid respectively, said hydraulic sump and pump including a flexible conduit having opposed end portions in fluid communication with said chamber and said sump wherein said plurality of arms are caused to extend linearly away from said trailer hitch tongue section when a selected volume of the fluid is introduced into said chamber;
    wherein said hydraulic sump and pump are mounted on top of said anchor beam and are readily accessible by the operator during loading and unloading procedures such that the operator can manually deactivate said hydraulic sump and pump as needed.

2. The trailer hitch assembly of claim 1, wherein said anchor beam further comprises:
    a castor operably attached to a lower one of said anchor beam end portions; and
    a handle securely connected to said anchor beam and offset adjacent an upper one of said anchor beam end portions for assisting the operator to manually bias said castor wheel and an elongated body of said anchor beam between alternate positions.

3. The trailer hitch assembly of claim 1, wherein said trailer hitch tongue section is intermediately juxtaposed between said anchor beam and the vehicle rear end when said ram is biased to a retracted position, said anchor beam being linearly displaced with said one support arm when said ram is biased towards an extended position.

4. A remotely operable trailer hitch assembly for towing various types of boats between remote locations such that the boats can be loaded and unloaded from a water ramp without requiring a rear end of a towing vehicle to dip down into the water, said trailer hitch assembly comprising:
    a controller mounted within a vehicle cab and electrically coupled to an internal power supply source of the vehicle;
    a trailer hitch tongue section provided with an elongated chamber formed therein and operably connected to a rear portion of the vehicle, said tongue section having axially opposed end portions defining a ball-shaped socket and an opening respectively;
    an adaptable ram including a plurality of linearly displaceable support arms formed from tubular steel and concentrically engaged within said chamber, said support arms being aligned along a horizontal path upwardly spaced from a ground surface;
    a trailer sized and shaped for receiving and supporting a boat thereon, said trailer being provided with a plurality of wheels and a front end portion attached to said ram such that said trailer can be towed between remote locations;
    an auxiliary anchor beam oriented along a vertical path traversing one said support arms wherein said anchor beam is provided with axially aligned end portions situated above and below said one support arm for assisting to maintain said ram at a substantially stable position during loading and unloading conditions; and means for telescopically adapting said support arms between extended and retracted positions such that a spatial distance between the vehicle and the boat can be selectively biased as desired by the operator;

wherein said telescopic means comprises a combined hydraulic sump and pump electrically mated to said controller such that an operator can remotely operate said hydraulic sump and pump while seated within the vehicle cab, said hydraulic sump and pump housing and discharging a predetermined volume of fluid respectively, said hydraulic sump and pump including a flexible conduit having opposed end portions in fluid communication with said chamber and said sump wherein said plurality of arms are caused to extend linearly away from said trailer hitch tongue section when a selected volume of the fluid is introduced into said chamber;

wherein said hydraulic sump and pump are mounted on top of said anchor beam and are readily accessible by the operator during loading and unloading procedures such that the operator can manually deactivate said hydraulic sump and pump as needed.

5. The trailer hitch assembly of claim 4, wherein said anchor beam further comprises:

a castor operably attached to a lower one of said anchor beam end portions; and a handle securely connected to said anchor beam and offset adjacent an upper one of said anchor beam end portions for assisting the operator to manually bias said castor wheel and an elongated body of said anchor beam between alternate positions.

6. The trailer hitch assembly of claim 4, wherein said trailer hitch tongue section is intermediately juxtaposed between said anchor beam and the vehicle rear end when said ram is biased to a retracted position, said anchor beam being linearly displaced with said one support arm when said ram is biased towards an extended position.

7. A remotely operable trailer hitch assembly for towing various types of boats between remote locations such that the boats can be loaded and unloaded from a water ramp without requiring a rear end of a towing vehicle to dip down into the water, said trailer hitch assembly comprising:

a controller mounted within a vehicle cab and electrically coupled to an internal power supply source of the vehicle;

a trailer hitch tongue section removably attachable to the vehicle and provided with an elongated chamber formed therein and operably connected to a rear portion of the vehicle, said tongue section having axially opposed end portions defining a ball-shaped socket and an opening respectively;

an adaptable ram including a plurality of linearly displaceable support arms formed from tubular steel and concentrically engaged within said chamber, said support arms being aligned along a horizontal path upwardly spaced from a ground surface;

a trailer sized and shaped for receiving and supporting a boat thereon; said trailer being provided with a plurality of wheels and a front end portion attached to said ram such that said trailer can be towed between remote locations;

an auxiliary anchor beam oriented along a vertical path traversing one said support arms wherein said anchor beam is provided with axially aligned end portions situated above and below said one support arm for assisting to maintain said ram at a substantially stable position during loading and unloading conditions; and means for telescopically adapting said support arms between extended and retracted positions such that a spatial distance between the vehicle and the boat can be selectively biased as desired by the operator;

wherein said telescopic means comprises a combined hydraulic sump and pump electrically mated to said controller such that an operator can remotely operate said hydraulic sump and pump while seated within the vehicle cab, said hydraulic sump and pump housing and discharging a predetermined volume of fluid respectively said hydraulic sump and pump including a flexible conduit having opposed end portions in fluid communication with said chamber and said sump wherein said plurality of arms are caused to extend linearly away from said trailer hitch tongue section when a selected volume of the fluid is introduced into said chamber;

wherein said hydraulic sump and pump are mounted on top of said anchor beam and are readily accessible by the operator during loading and unloading procedures such that the operator can manually deactivate said hydraulic sump and pump as needed.

8. The trailer hitch assembly of claim 7, wherein said anchor beam further comprises:

a castor operably attached to a lower one of said anchor beam end portions; and a handle securely connected to said anchor beam and offset adjacent an upper one of said anchor beam end portions for assisting the operator to manually bias said castor wheel and an elongated body of said anchor beam between alternate positions.

9. The trailer hitch assembly of claim 7, wherein said trailer hitch tongue section is intermediately juxtaposed between said anchor beam and the vehicle rear end when said ram is biased to a retracted position, said anchor beam being linearly displaced with said one support arm when said ram is biased towards an extended position.

* * * * *